US011810049B2

(12) United States Patent
Miller et al.

(10) Patent No.: US 11,810,049 B2
(45) Date of Patent: Nov. 7, 2023

(54) SYSTEMS AND METHODS TO GENERATE A LAST MILE TRAVEL ROUTE FOR A DELIVERY ROBOT

(71) Applicant: Ford Global Technologies, LLC, Dearborn, MI (US)

(72) Inventors: Justin Miller, Berkley, MI (US); Pavithra Madhavan, Windsor (CA); Sanghyun Hong, Ann Arbor, MI (US); Jianbo Lu, Northville, MI (US)

(*) Notice: Subject to any disclaimer, the term of this patent is extended or adjusted under 35 U.S.C. 154(b) by 42 days.

(21) Appl. No.: 17/407,458

(22) Filed: Aug. 20, 2021

(65) Prior Publication Data

US 2023/0058639 A1    Feb. 23, 2023

(51) Int. Cl.
| | |
|---|---|
| G06Q 10/0832 | (2023.01) |
| G06Q 10/0833 | (2023.01) |
| G06Q 50/30 | (2012.01) |
| G05D 1/02 | (2020.01) |

(52) U.S. Cl.
CPC ....... *G06Q 10/0832* (2013.01); *G05D 1/0212* (2013.01); *G05D 1/0274* (2013.01); *G06Q 10/0833* (2013.01); *G06Q 50/30* (2013.01)

(58) Field of Classification Search
CPC .......... G06Q 10/0832; G06Q 10/0833; G06Q 50/30; G05D 1/0212; G05D 1/0274
See application file for complete search history.

(56) References Cited

U.S. PATENT DOCUMENTS

| | | | |
|---|---|---|---|
| 9,573,684 B2 | 2/2017 | Kimchi et al. | |
| 10,388,172 B1 | 8/2019 | Boyd et al. | |
| 10,726,379 B1* | 7/2020 | Donnelly | G05D 1/104 |
| 11,151,509 B1* | 10/2021 | Mishra | G06Q 10/08355 |

(Continued)

FOREIGN PATENT DOCUMENTS

DE    102015208445 A1    11/2016

OTHER PUBLICATIONS

Brown, R. (Jan. 27, 2020). How to improve computer vision in AI drones using image annotation services ?. Cogitotech. https://www.cogitotech.com/blog/how-to-improve-computer-vision-drones-image-annotation/ (Year: 2020).*

(Continued)

*Primary Examiner* — Shannon S Campbell
*Assistant Examiner* — Manal A. Alsamiri
(74) *Attorney, Agent, or Firm* — Brandon Hicks; Eversheds Sutherland (US) LLP

(57) ABSTRACT

This disclosure is generally directed to systems and methods for generating a last mile travel route for a delivery robot. In an example embodiment, an individual captures an image of a frontage of a property. The image may include a package drop-off spot where a package can be dropped off by the delivery robot. The individual may also insert labels and/or illustrations into the image for conveying information such as object descriptors (front door, drop-off spot, etc.), traversable areas (driveway, walkway, etc.), and non-traversable areas (lawn, flower bed, etc.). The image is converted by a computer into a travel map that the delivery robot can use to identify a travel route through the frontage area of the property. The travel map may be provided in various forms such as a semantic map of the frontage area or a bird's eye view rendering of the frontage area.

8 Claims, 10 Drawing Sheets

(56) References Cited

U.S. PATENT DOCUMENTS

| | | | | |
|---|---|---|---|---|
| 2014/0180914 | A1* | 6/2014 | Abhyanker | G05D 1/102 |
| | | | | 705/332 |
| 2014/0330456 | A1* | 11/2014 | Lopez Morales | G05D 1/0022 |
| | | | | 701/3 |
| 2016/0054138 | A1* | 2/2016 | Kojo | G01C 21/3602 |
| | | | | 701/423 |
| 2017/0011343 | A1* | 1/2017 | Stenneth | B25J 9/163 |
| 2017/0200197 | A1 | 7/2017 | Brubaker | |
| 2018/0357907 | A1* | 12/2018 | Reiley | H04W 4/023 |
| 2019/0377349 | A1* | 12/2019 | van der Merwe | G05D 1/0231 |
| 2019/0384304 | A1* | 12/2019 | Towal | G06N 3/08 |
| 2020/0209401 | A1* | 7/2020 | Motoyama | G06T 7/50 |
| 2020/0293985 | A1 | 9/2020 | Stuckman et al. | |
| 2021/0081711 | A1* | 3/2021 | Muir | G06T 7/11 |
| 2021/0090280 | A1* | 3/2021 | Guizilini | H04N 13/271 |
| 2021/0295062 | A1* | 9/2021 | Kirstein | G06V 20/56 |
| 2021/0405638 | A1* | 12/2021 | Boyraz | G06V 20/64 |
| 2022/0121837 | A1* | 4/2022 | Cesic | G06Q 50/28 |

OTHER PUBLICATIONS

Davide Scarramuzza, "Application Challenges From A Bird's-Eye View", University of Zurich, Robotics & Perception Group, ResearchGate, John Wiley & Sons Ltd. Publisher, Dec. 26, 2017, 29 pages.

Iban Borras, "Robotics in Logistics: How Distribution is Changing", SalesLayer—https://blog.saleslayer.com/robotics-in-logistics, Oct. 15, 220, 15 pages.

Christine Horton, "Contactless food delivery: Are robots the future?", www.FoodandFarmingTechnology.com, Mar. 27, 2020, 5 pages.

* cited by examiner

SYSTEMS AND METHODS TO GENERATE A LAST MILE TRAVEL ROUTE FOR A DELIVERY ROBOT

BACKGROUND

A delivery robot may include an onboard computer having information for executing what may be referred to as a "last mile" of a delivery route. Traversing the last mile generally involves the delivery robot moving from a road or a curb to a package drop-off location at a residence or a business. In the case of a residence, the last mile area may include a driveway, a lawn, and/or a walkway, and may also include various obstacles such as a mailbox, a curb, and a tree. In one conventional delivery operation, the delivery robot may travel across the lawn to reach the drop-off location. While doing so, the delivery robot may use various sensors to avoid colliding with objects on the lawn. In another conventional delivery operation, the delivery robot may be provided a pre-mapped route to follow when making the delivery. The pre-mapped route may be obtained by executing a pre-mapping procedure performed by another robot that is explicitly configured to execute the pre-mapping procedure ahead of time.

Both these delivery operations suffer from certain handicaps such as risk, cost, and time delays. The first delivery operation involves an element of risk, such as associated with the delivery robot causing damage to the lawn and objects that may be present on the lawn. The second delivery operation involves various costs, including costs associated with deploying the robot for executing the pre-mapping procedure. The cost associated with deploying the robot can be particularly high if the pre-mapping procedure has to be carried out upon a number of residences or businesses. In some cases, such pre-mapping may turn out to be unnecessary, such as when a potential customer whose location has been pre-mapped fails to make a purchase. Other costs associated with the pre-mapping procedure may be attributable to activities such as transporting the robot to the premises, setting up the robot at the premises, and time spent carrying out the procedure.

It is therefore desirable to address issues such as the ones described above with respect to last mile deliveries carried out by delivery robots.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
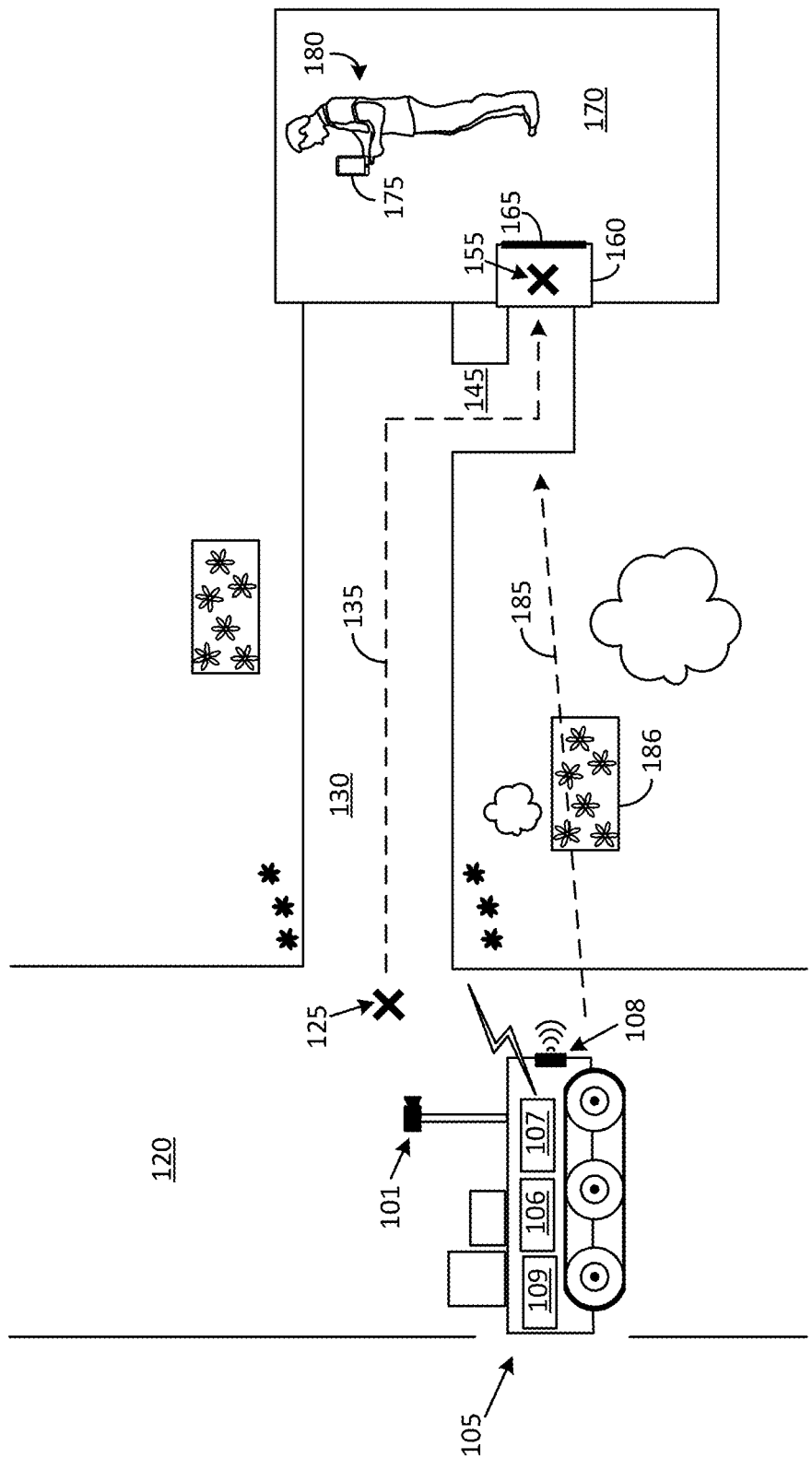
FIG. 1 illustrates an example scenario associated with a delivery robot in accordance with an embodiment of the disclosure.

In terms of a general overview, certain embodiments described, in this disclosure are directed to systems and methods related, to generating a travel map that is interpretable by a delivery robot for traversing a last mile of a package delivery route. In an example embodiment, an individual captures an image of a frontage of a property. The image may include a package drop-off point where a package can be dropped off by the delivery robot. In an example implementation, the individual may also insert labels and/or illustrations into the, image for conveying information such as, for example, object descriptors (front door, drop-off spot, etc.), traversable areas (driveway, walkway, etc.), and non-traversable areas (lawn, flower bed, etc.). The image is converted by a computer into a travel map that the delivery robot can use to identify a travel route through the frontage area of the property. The travel map may be provided in various forms such as, for example in the form of a semantic map of the frontage area or a bird's eye view rendering of the frontage area.

Illustrative Embodiments

The disclosure will be described more fully hereinafter with reference to the accompanying drawings, in which example embodiments of the disclosure are shown. This disclosure may however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words, terms, and phrases that are used in this disclosure must be interpreted as referring to various objects and actions that are generally understood in various forms and equivalencies by persons of ordinary skill in the art. For example, the phrase "delivery robot" as used herein may be referred to alternatively in general parlance as a "self-driven vehicle" or a "robotic vehicle." As another example, words such as "path" and "route," and words such as "package" and "product" may be used interchangeably in this disclosure and should be understood as being equivalent to each other in the context of the description. The word "building" as used herein refers to any structure such as, for example, a residence, a house, a business facility, or a commercial establishment. The word "image" as used herein refers to any of various kinds of media such as, for example, a picture, a photograph captured by a photographic camera, a digital image produced by a digital camera, or a graphical/digitized representation of a view or an object. An "image" can be a part of a video clip. The phrase "video clip," "video recording," and "video stream" may be used interchangeably in this disclosure and should be understood as being equivalent to each other in the context of the description. Furthermore, it should be understood that the word "example" as used herein is intended to be non-exclusionary and non-limiting in nature.

FIG. 1 illustrates an example scenario associated with a delivery robot 105 in accordance with an embodiment of the disclosure. The delivery robot 105 may be any of various types of autonomous or semi-autonomous terrestrial robots used to deliver various types of items such as, for example, a pizza, an item of mail, a grocery item, or an object. The words "package" or "product" as used herein generically refers to any of such items. The delivery robot 105 may include various components such as, for example, a navigation system 106, a communication system 107, a computer 109, and various sensors and/or detectors. The sensors and/or detectors can include devices such as, for example, a video camera, a digital camera, an infrared camera, an object detector, a distance sensor, a proximity sensor, an audio sensor, a light detection and ranging (LIDAR) device, a radar device, and/or a sonar device that are communicatively coupled to the navigation system 106. The signals provided by the various sensors and/or detectors, such as for example an image provided by a camera 101 or a signal provided by an ultrasonic sensor 108, may be evaluated by the computer 109 for determining a travel route for the delivery robot 105 when moving on the premises of the building 170.

The computer 109 may receive navigation assistance in the form of a travel map that is generated by using an image captured by an individual 180. The individual 180 can be, for example, a resident of the building 170, an owner of the building 170, or any other person who is associated with the building 170 (lienholder, lessee, property caretaker, etc.). In this example, the individual 180 may capture the image by use of a personal communications device 175, which can be any of various devices such as, for example, a smartphone, a tablet computer, a personal computer, or a wearable device. The image may be converted into a travel map by a computer in the personal communications device 175 and/or by the computer 109 in the delivery robot 105. The travel map can be used by the delivery robot 105 in cooperation with sensor signals generated by the various sensors and detectors on the delivery robot 105, thereby minimizing an amount of time taken by the delivery robot 105 to make a delivery.

In addition to minimizing delivery time, the travel map may also help the delivery robot 105 avoid accidents that may possibly occur if the delivery robot 105 depended solely on the sensors and detectors. For example, the travel map can assist the navigation system 106 of the delivery robot 105 to plot a travel route that avoids travelling over a lawn area and risking damage to the turf and vegetation on the lawn area. As another example, the travel map may assist the navigation system 106 of the delivery robot 105 to avoid certain types of obstacles that may be undetectable or difficult to detect by the detectors and sensors. One example of such an obstacle is a portion of ground that is sodden, inclined, or contains loose gravel, which may be undetectable by the sensors and may pose traction issues for the wheels of the delivery robot 105.

The communication system 107 is configured to permit the delivery robot 105 to wirelessly communicate with the personal communications device 175 for obtaining items such as, for example, an image captured by the individual 180. In the example scenario shown in FIG. 1, the frontage area may include a driveway 130 and a walkway 145. The walkway 145 leads from the driveway 130 to a stoop 160 in front of a door 165 of the building 170. The individual 180 may designate a package drop-off spot 155 on the stoop 160 for packages to be dropped off by the delivery robot 105.

A conventional delivery robot that is unassisted by the individual 180 may, in one scenario, opt to travel from a current location on a sidewalk 120 to the package drop-off spot 155 by using a shortest distance route 185. The shortest distance route 185 cuts across a lawn located adjacent to the driveway 130 and the individual 180 may find it objectionable for the delivery robot 105 to travel on the lawn and cause damage to the lawn, particularly, for example, if the lawn is wet and/or has been sodded recently. The delivery robot 105 may also cause other types of damage to vegetation and lawn ornaments such as, for example, damage to a flower bed 186 that is in the path of the shortest distance route 185. Consequently, in an example method of operation in accordance with the disclosure, the computer 109 of the delivery robot 105 uses a travel map that is generated from an image captured by the individual 180 so as to avoid issues such as, for example, those that may be caused by using the shortest distance route 185.

In an example scenario, a computer, such as, for example, the computer 109, may evaluate an image provided by the individual 180 and generate a travel map. The computer 109 may then evaluate the travel map and identify a travel route from the sidewalk 120 to the package drop-off spot 155. The travel route 135 extends along the driveway 130 and the walkway 145 from an origination spot 125 on the sidewalk 120 to the package drop-off spot 155 on the stoop 160.

Figure 2:
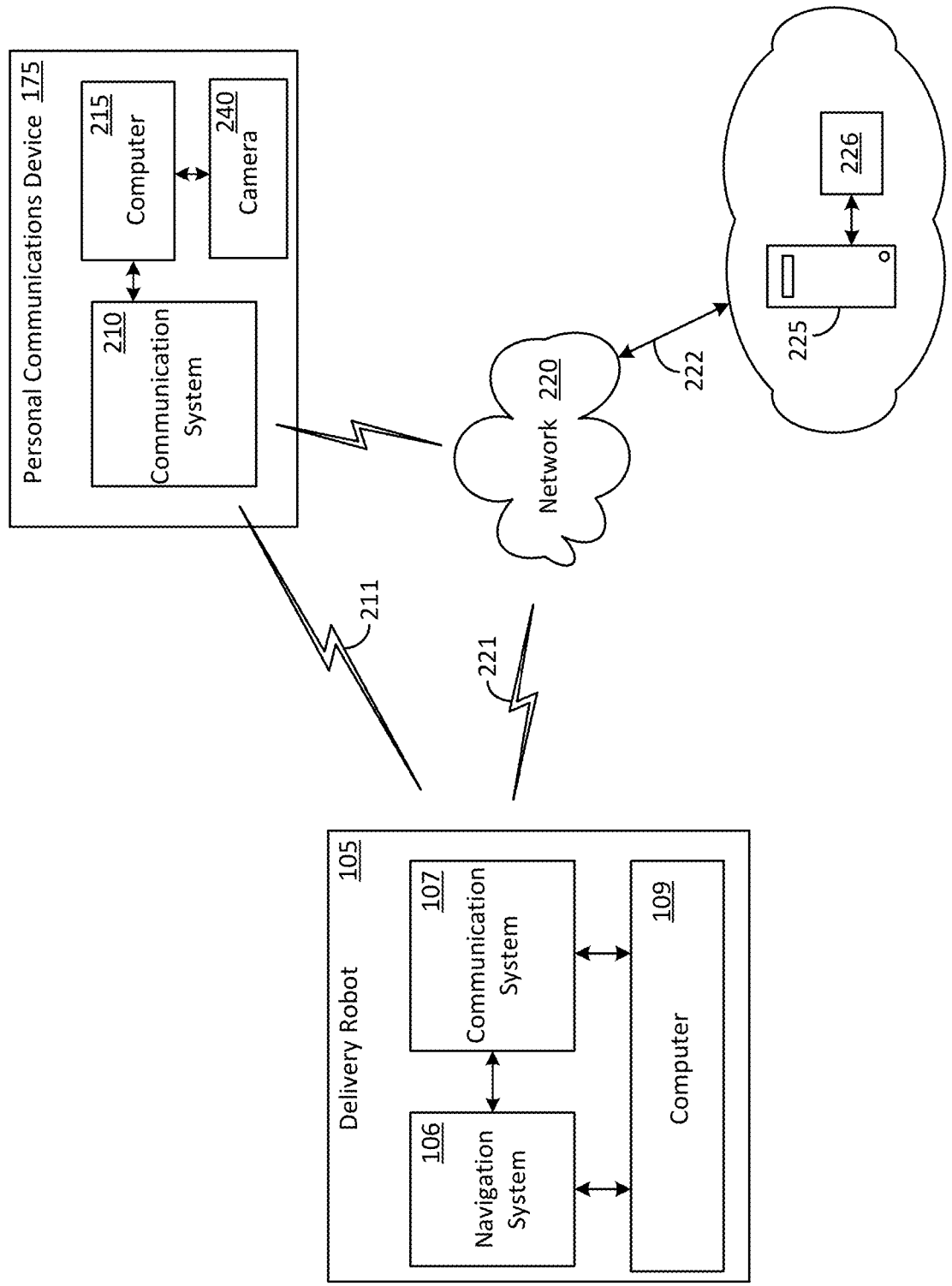
FIG. 2 shows some example components that may be included in a delivery robot and other objects in accordance with an embodiment of the disclosure.

FIG. 2 shows some, example components that may be included in the delivery robot 105 and other objects, in accordance with an embodiment of the disclosure. As described above, the delivery robot 105 can include the computer 109, the navigation system 106, and the communication system 107. The computer 109 is communicatively coupled to the communication system 107 and the navigation system 106 for controlling various operations of the delivery robot 105. The computer 109 may use signals provided by the navigation system 106 to operate hardware such as a drive mechanism (motor, battery, brakes, etc.) and a steering mechanism for moving the delivery robot 105, such as along the travel route 135.

The communication system 107 is configured to communicate with the personal communications device 175 of the individual 180 by using a wireless link 211 that may be implemented using any of various forms of wireless technologies such as, for example, cellular communications, WiFi communications, and optical communications. The communication system 107 may also communicate with the personal communications device 175 and/or a server computer 225 via a wireless link 221 and a network 220. The wireless link 221 may be implemented by using any of various forms of wireless technologies such as, for example, the ones used for the wireless link 211.

The network 220 may include any one, or a combination of networks, such as, for example, a wide area network (WAN), a telephone network, a cellular network, a cable network, a wireless network, and/or private/public networks such as the Internet. For example, the network 220 may support communication technologies such as TCP/IP, Bluetooth, cellular, near-field communication (NFC), Wi-Fi, Wi-Fi direct, machine-to-machine communication, and/or man-to-machine communication. The communication link 222 that supports communications between the server computer 225 and the network 220 may incorporate one or more of various, types of wired and/or wireless technologies used for communications. The server computer 225 may be coupled to a storage device 226, which can be configured as a cloud storage device.

The personal communications device 175 of the individual 180 can include a communication system 210, a computer 215, and a camera 240. The communication system 210 is configured to communicate with the communication system 107 in the delivery robot 105 (via the wireless link 211) and/or to communicate with the server computer 225 via the network 220. In an example scenario, the individual 180 may operate the camera 240 to capture an image of the frontage area of the property on which the building 170 is located. The image can be a red-green-blue (RGB) image, for example. The computer 215 may propagate the RGB image via the communication system 210 to the computer 109 in the delivery robot 105 and/or the server computer 225. In some cases, the computer 215 may format the RGB image into any of various other formats (jpeg, pdf, etc.) before propagating to the computer 109 and/or the server computer 225. In another example scenario, the computer 215 may operate upon the image captured by the camera 240 and generate therefrom, a travel map that is propagated to the computer 109 and/or the server computer 225.

Figure 3:
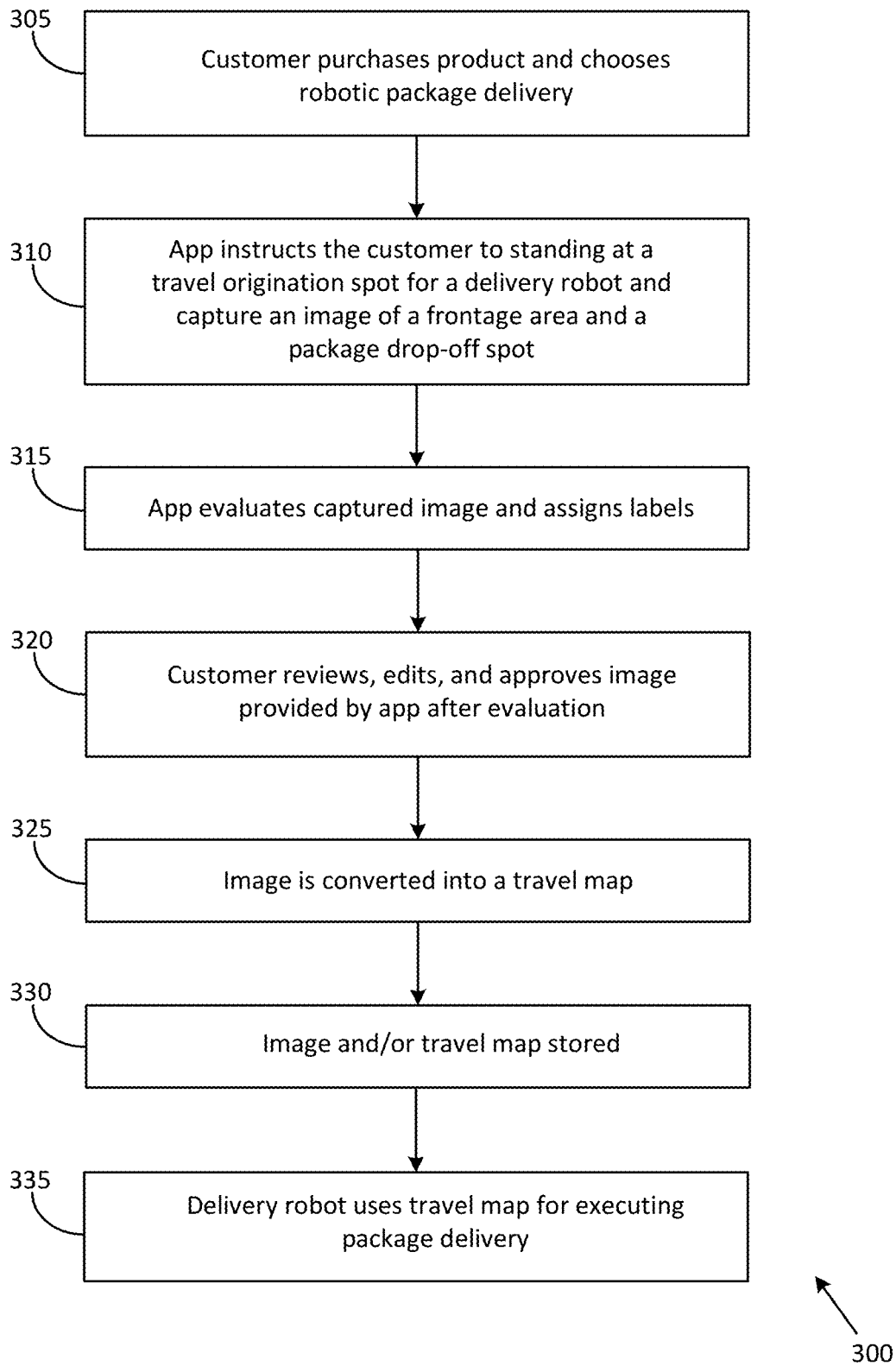
FIG. 3 shows a flowchart of a method to generate a travel map for a delivery robot in accordance with an embodiment of the disclosure.

FIG. 3 shows a flowchart 300 of a method to generate a travel map for the delivery robot 105 in accordance with an embodiment of the disclosure. The flowchart 300 illustrates a sequence of operations that can be executed by various'entities such as, for example, the individual 180, the computer 215 in the personal communications device 175, the computer 109 in the delivery robot 105, and the server computer 225. Devices such as the computer 215 in the personal communications device 175, the computer 109 in the delivery robot 105, and the server computer 225 can execute operations by using hardware, software, or a combination thereof. In the context of software, the operations represent computer-executable instructions stored on one or more non-transitory computer-readable media (such as a memory in the computer 215 of the personal communications device 175 a memory in the computer 109 of the delivery robot 105, and a memory in the server computer 225), that, when executed by one or more processors (such as a processor in the computer 215 of the personal communications device 175, a processor in the computer 109 of the delivery robot 105, and a processor in the server computer 225 respectively), perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 300 may be carried out by using software that may be downloaded into the computer 215 of the personal communications device 175, the computer 109 of the delivery robot 105, or the server computer 225.

At block 305, a customer purchases a product and opts for robotic delivery service. In the example scenario shown in FIG. 1, the individual 180, who is the customer, may perform this action by entering information into a software application in the personal communications device 175. In an example case, the software application may be provided by a vendor such as, Amazon®, for example, and the individual 180 may click on a check box to opt for robotic delivery service.

At block 310, the software application may display a message upon a display screen of the personal communications device 175 seeking last mile assistance from the individual 180. The individual 180 may respond to the message by requesting instructions. The software application may provide instructions to the individual 180 for capturing an image of the frontage area of the property on which the building 170 is located. The instructions may be provided in the form of text and/or in the form of voice instructions.

In an example scenario, the text and/or voice instructions may instruct the individual 180 to stand at the origination spot 125 and point an imaging device such as, for example, the camera 240 in the personal communication device 175 (or any other camera that is not, a part of the personal communication device 175) towards the building 170 in a manner that preferable includes the drop-off spot 155 and the area between the drop-off spot 155 and the origination spot 125. The text and/or voice instructions may also provide details of camera settings such as, for example, a field-of-view setting, a shutter speed, and a focus setting. The camera settings may be defined, for example, so as to include in the image, the driveway 130, the walkway 145, and the stoop 160 that are shown in the example scenario illustrated in FIG. 1. The text, and/or voice instructions may further recommend that the camera be held at a certain angle and at a certain height above the ground that may mimic a view as perceived by the camera 101 mounted upon the delivery robot 105.

At block 315, the software application may evaluate an image captured by the individual 180 to identify various objects and/or ground surfaces, followed by insertion of various types of labels that are associated with the objects and ground surfaces (such as, for example, building, mailbox, sky, street, lawn, walkway, driveway, traversable area and non traversable area). The captured image together with labels may be displayed on the display screen of the personal communications device 175.

At block 320, the individual 180 may examine the image and may opt to edit some or all of the labels for various reasons such as, for example, to correct labeling errors, and/or to insert additional labels. The individual 180 may then approve and submit the image and the labels for further action.

At block 325, the image is converted into a travel map that the delivery robot 105 can use to identify a travel route through the frontage area of the property. In one implementation in accordance with the disclosure, the conversion is performed in an online mode of operation by the computer 215 in the personal communications device 175. In another implementation in accordance with the disclosure, the personal communications device 175 may transmit the approved image (and labels) to another device, such as, for example, the computer 109 in the delivery robot 105 and/or the server computer 225, which perform the conversion in an offline mode of operation. The image can be converted into one of various types of travel maps using various techniques some of which are described below. In one example implementation, the travel map is created in the form of a semantic image. In another example implementation, the travel, map is created in the form of a bird's eye view rendering. In another example implementation, the travel map is created in the form of a metrical feature map. In yet another example implementation, the travel map is created in the form of a topographical map that may include trajectory links and pose information.

At block 330, the image and/or the travel map may be stored in the personal communications device 175, the delivery robot 105, and/or the server computer 225 for various purposes. In an example scenario, the stored image and/or travel map be accessed, modified, and/or deleted at a later instant in time. An image may be deleted and replaced with another image under certain conditions such as, for example, if some objects and/or features of the frontage area have changed (a new walkway path is constructed, a tree is planted, etc.) or the package drop-off spot 155 is changed.

At block 335, the delivery robot 105 uses the travel map to identify a travel route through the frontage area and drop off the purchased package at the package drop-off spot 155. In an example scenario, the travel map may be made available to the delivery robot 105 via uploading of the travel map by the computer 215 in the personal communications device 175 at the time of purchase of the product (along with a purchase order, for example) and/or may be fetched by the delivery robot 105 from the server computer 225 prior to, or at the time of, delivery of the purchased product.

The delivery robot 105 may identify the travel route from the travel map by moving to the spot from which the image was captured by the individual 180, such as, for example, the origination spot 125. Identifying the travel route may be carried out, for example, by the computer 109, by using the labels and depth information to perform feature mapping of the travel map. Feature mapping may be carried out by using various, feature matching algorithms associated with simultaneous localization and mapping (SLAM). The feature mapping may be supported by signals received from the various sensors (camera 101, ultrasonic sensor 108, etc.) and/or UPS signals. In an example procedure, the computer 109 may use an online path planner to generate the travel route from the origination spot 125 to the package drop-off spot 155. The online path planner generates the travel route by inserting waypoints and by interpreting the labels so as to identify traversable areas and to, avoid colliding with objects.

In some scenarios, the individual 180 may fail to provide labels and some other details, but may merely indicate the package drop-off spot 155 in the captured image. The computer 109 of the delivery robot 105 may use a combination of exploration procedures, destination recognition procedures, semantic segmentation procedures, and/or view matching procedures (two-dimensional (2) or three-dimensional (3D)) for reaching the package drop-off spot 155.

Figure 4:
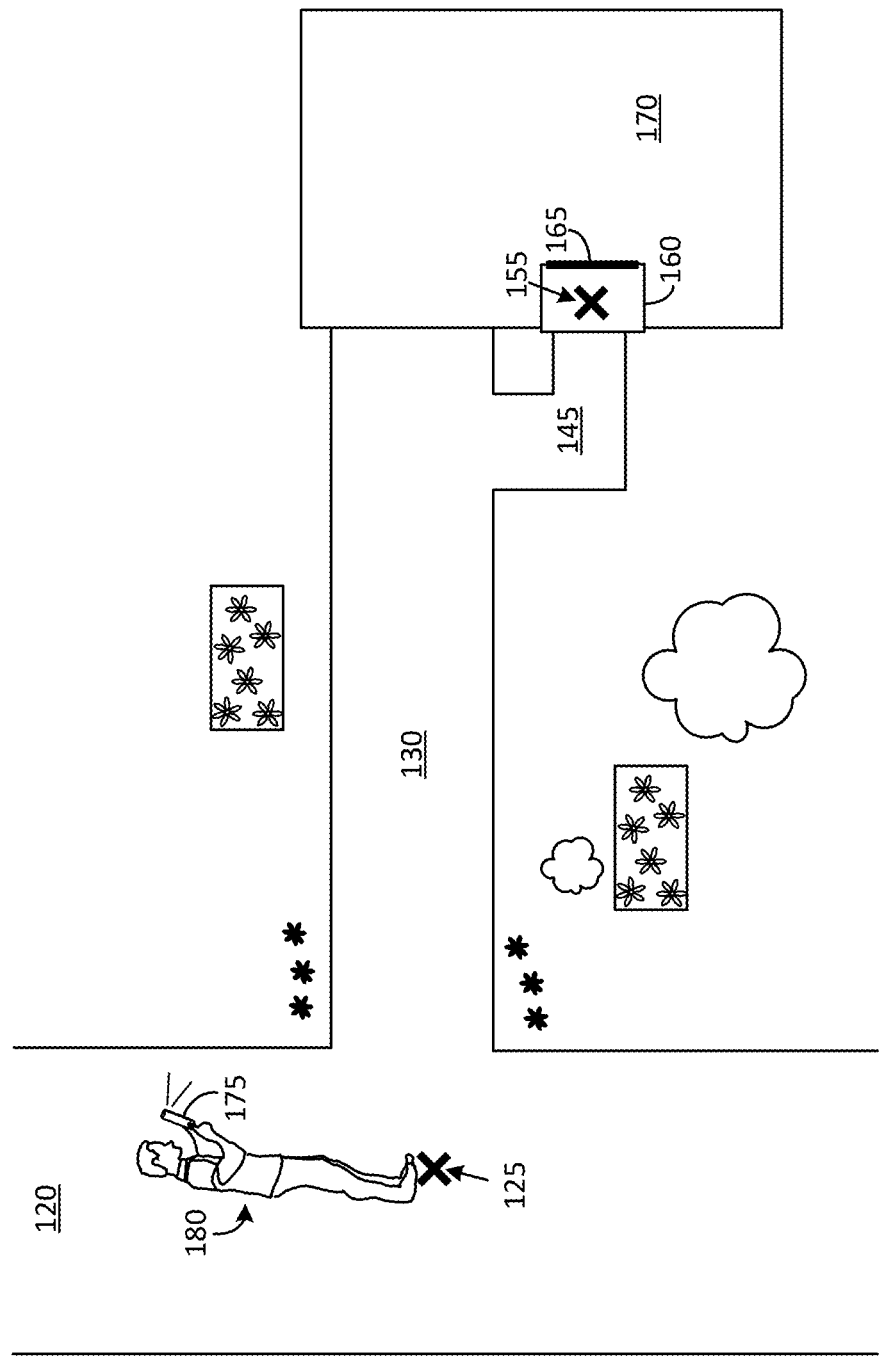
FIG. 4 illustrates a first example scenario associated with capturing an image that can be used to generate a travel map for a delivery robot in accordance with an embodiment of the disclosure.

FIG. 4 illustrates a first example scenario associated with capturing an image that can be used to generate a travel map for the delivery robot 105 in accordance with an embodiment of the disclosure. As described above with reference to block 310, the software application in the personal communications device 175 may issue instructions in text form on a display screen of the personal communications device 175 and/or as voice instructions through a speaker of the personal communications device 175. The first instruction may recommend that the individual 180 position himself/herself at a spot on the sidewalk 120 from where the delivery robot 105 is expected to enter the premises in which the building 170 is located. In some cases, the software application may recommend a pre-defined spot on the sidewalk 120. The pre-defined spot may, for example, be a spot on the sidewalk 120 at which the delivery robot 105 is offloaded from a delivery truck. The pre-defined spot may be indicated to the individual 180 in various forms such as, for example, in the form of GPS coordinates, in the form of an x-mark on a map, and/or in the form of a landmark.

In the illustrated example, the individual 180 responds to the first instruction by positioning himself/herself at the origination spot 125 on the sidewalk 120. The software application may then instruct the individual 180 to point the camera 240 of the personal communications device 175 towards a package drop-off spot preferred by the individual 180, such as, for example, the package drop-off spot 155. The individual 180 may also be informed that the image captured by the individual 180 is intended for use by the delivery robot 105 and as such it is desirable to capture the image with a point-of-view of the delivery robot 105 in mind. The software application may assist the individual 180 to perform such an action by recommending, for example, various settings that may be applied to the camera 240 of the personal communications device 175 and/or various positions and/or orientations for holding the personal communications device 175 when executing the video recording. The various positions and/or orientations can correspond to settings and orientations of a camera provided in the delivery robot 105 such as, for example, the camera 101. The individual 180 may operate the camera 240 for capturing an image and the software application may perform the operations described above with respect to block 315 through block 330.

Figure 5:
FIG. 5 shows an example image captured by an individual that can be used to generate a travel map for a delivery robot in accordance with an embodiment of the disclosure.

FIG. 5 shows an example image 500 captured by the individual 180 that can be used to generate a travel map for the delivery robot 105 in accordance with an embodiment of the disclosure. The example image 500 is an RGB, image of a frontage area of a building 505 captured by the camera 240 and operated upon by the software application in the personal communications device 175.

Figure 6:
FIG. 6 shows a semantic image generated from the image shown in FIG. 5.

FIG. 6 shows a semantic image 600 generated by the software application, based on evaluating the image 500 captured by the camera 240. The semantic image 600 is one example of a travel map that may be used by the delivery robot 105 to execute a package delivery. Each pixel of the semantic image 600 is associated with an integer that operates as a class label for various objects and areas present in the image 500. The various objects and areas can include, for example, a front door 605 of the building 505, a driveway 610 in the frontage area, and a lawn 615. The pixels corresponding to the front door 605 may be classified in a first class, the pixels corresponding to the driveway 610 may be classified in a second class, the pixels corresponding to the lawn 615 may be classified in a third class, and so on.

Figure 7:
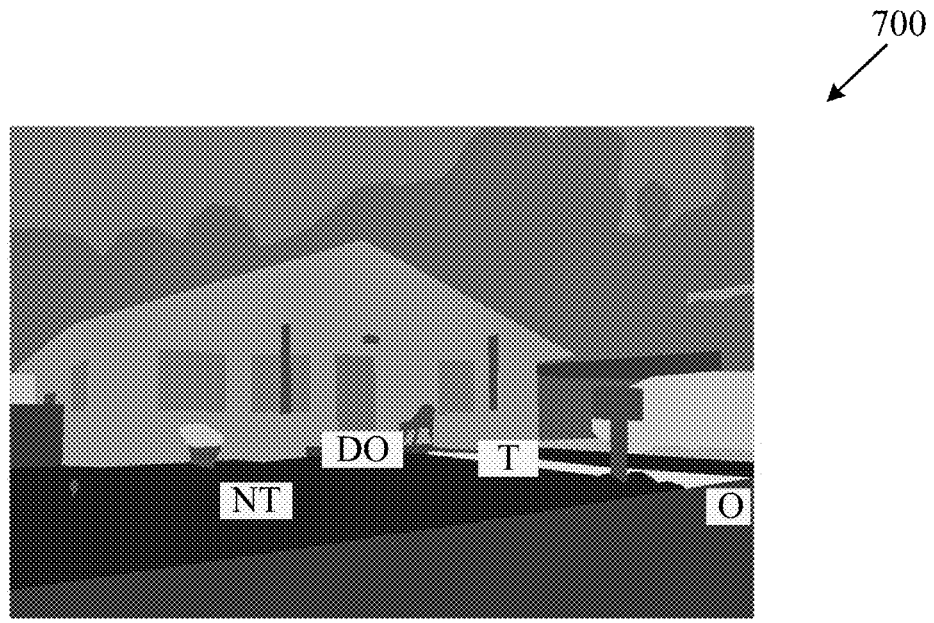
FIG. 7 shows some example labels assigned to the semantic image shown in FIG. 6

FIG. 7 shows a semantic map 700 that may be created by inserting some labels to the semantic image 600. The labels may be automatically inserted by the software application based on an object recognition procedure or may be inserted by the individual 180 after visually examining the semantic image 600. The example labels include a label "DO" which designates a package drop-off spot, a label "T" which designates a traversable area, a label "NT" which designates anon-traversable area, and a label "O" which designates an origination spot for the delivery robot 105.

Figure 8:
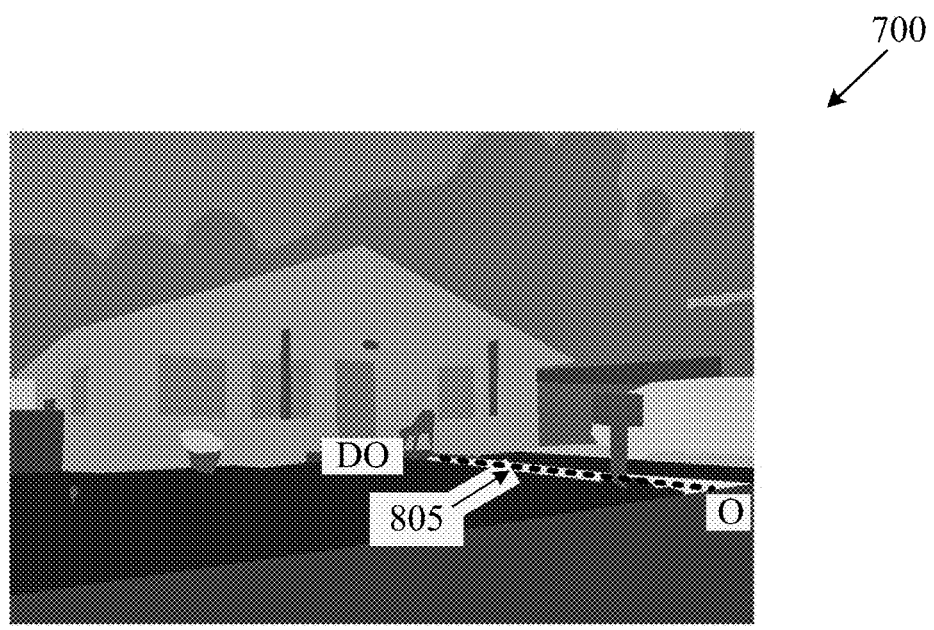
FIG. 8 illustrates a travel route that is generated by a delivery robot by using the image shown in FIG. 7.

FIG. 8 illustrates a travel route 805 that is generated by the computer 109 in the delivery robot 105 by using the semantic map 700. The travel route 805 extends from the origination spot ("O") to the package drop-off spot ("DO") and excludes areas labeled as "NT."

Figure 9:
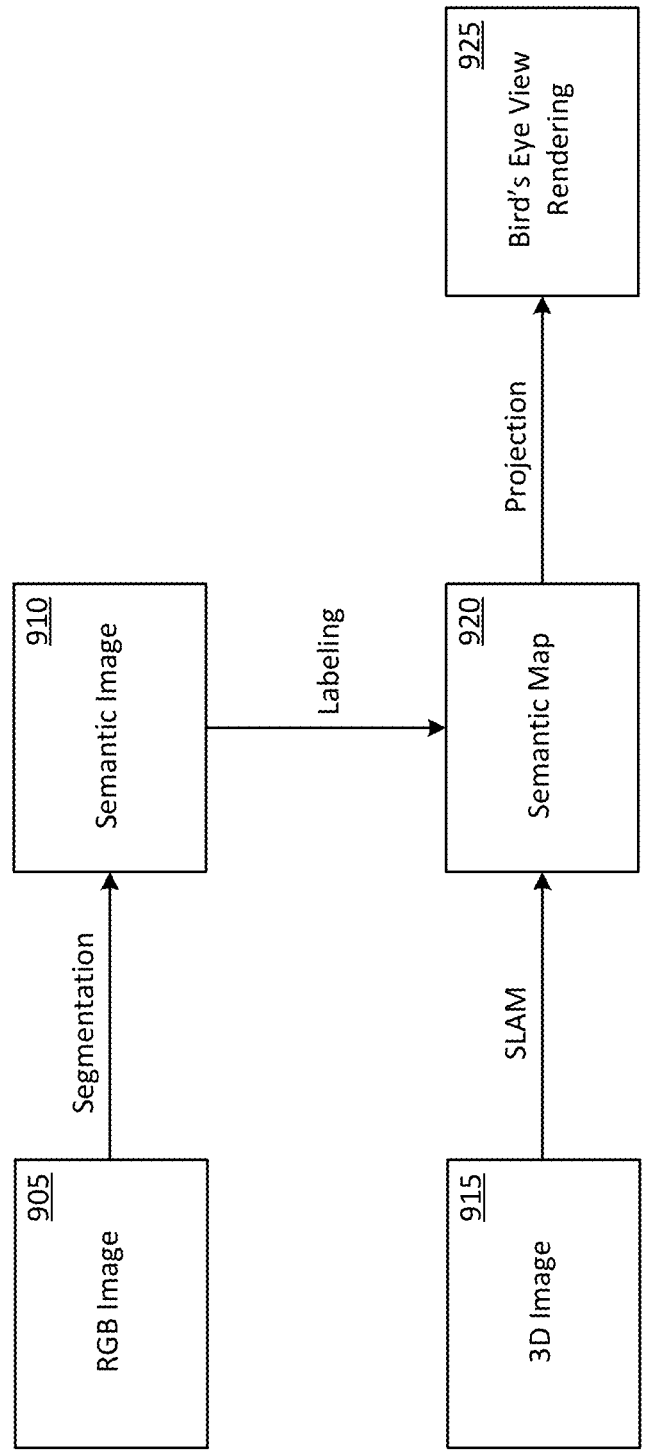
FIG. 9 is a block diagram of an example procedure to generate a travel map for a delivery robot in accordance with an embodiment of the disclosure.

FIG. 9 is a block diagram of an example procedure to generate a travel map for the delivery robot 105 in accordance with an embodiment of the disclosure. The example procedure may be executed by a software application that is provided in the personal communications device 175 of the individual 180 or in another device such as, for example, the server computer 225 and/or the computer 109 in the delivery robot 105.

As a part of this procedure, an RGB image 905 may be converted into a semantic image 910. One example of the semantic image 910 is the semantic image 600 described above with reference to FIG. 6. The semantic image 910, which provides 2D information can be converted into a semantic map 920 by including some labels. One example of the semantic map 920 is the semantic map 700 described above with reference to FIG. 7. The semantic map 920, which provides 2D information can be converted into a bird's eye view rendering 925 that provides 3D information by the addition of depth information into the semantic map 920. In an example procedure, the bird's eye view rendering 925 may be created by using SLAM procedures upon a 3D image 915 and projecting the semantic map 920 into 3D space.

Figure 10:
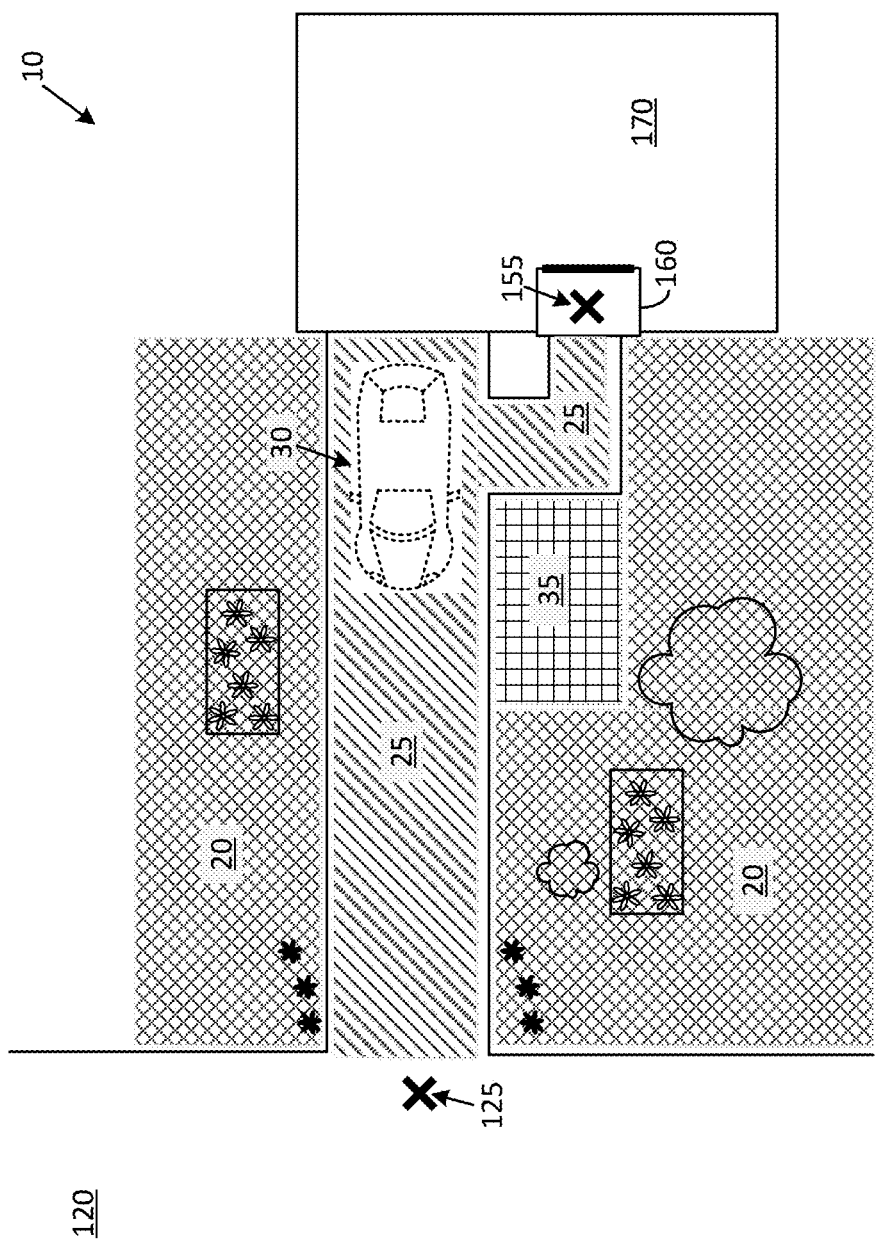
FIG. 10 shows an example travel map that includes markups in accordance with an embodiment of the disclosure.

FIG. 10 shows an example travel map that includes markups in accordance with an embodiment of the disclosure. The travel map is provided in the form of a semantic, map 10 that can be used by the delivery robot 105 for delivering a product on the premises of the building 170. The markups can be used in lieu of, or in addition to, labels such as the example labels described above.

The semantic map 10 includes certain areas that the individual has categorized as traversable, non-traversable, and conditionally traversable. A traversable area is indicated in the semantic map 10 by a shaded area 25. The non-traversable areas are indicated in the semantic map 10 by shaded areas 20. A conditionally traversable area is indicated in the semantic map 10 by a shaded area 35. The conditionally traversable area may be defined on the basis of various factors. In the illustrated scenario, a vehicle 30 may be parked at one end of the driveway at various times such as, for example, during after-work hours. It would be infeasible for the delivery robot 105 to move in this area during such times. Consequently, the delivery robot 105 can recognize that package delivery may be carried out by traveling in the conditionally traversable area (shaded area 35) during such times. The delivery robot 105 can recognize that, package delivery may be carried out by traveling in the traversable area (shaded area 25) during times when the vehicle 30 is not parked in the driveway.

Figure 11:
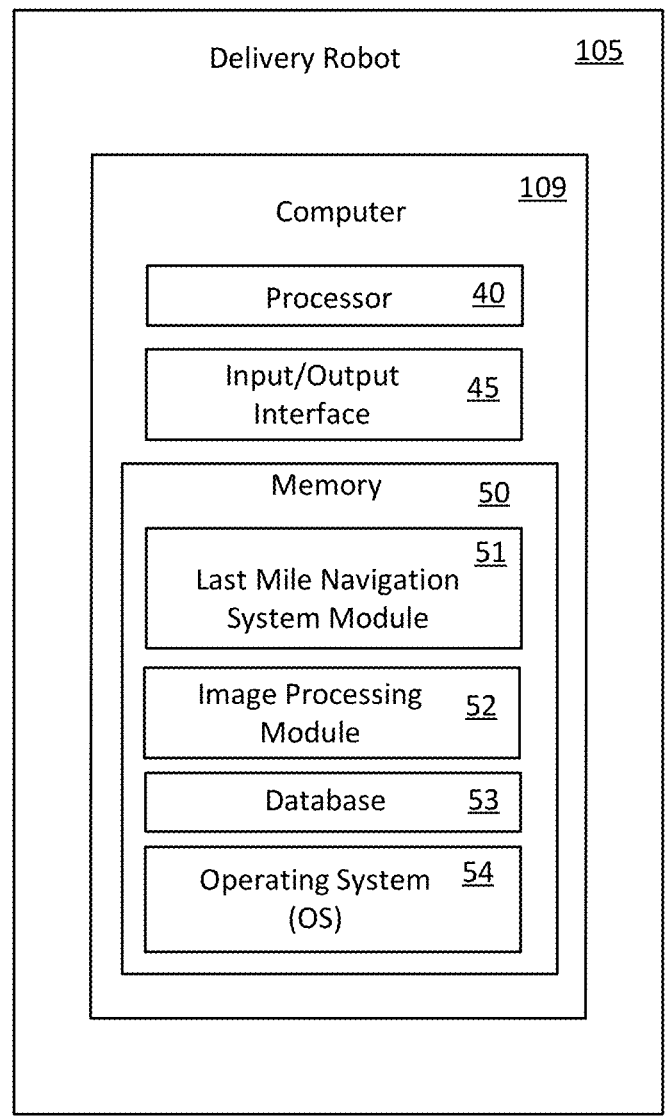
FIG. 11 shows some example components that may be included in a computer that is a part of a delivery robot in accordance with an embodiment of the disclosure.

FIG. 11 shows some example components that may be included in the computer 109 that is a part of the delivery robot 105 in accordance with an embodiment of the disclosure. The computer 109 may include various components such as, for example, a processor 40, an input/output interface 45, and a memory 50. The input/output interface 45 can be used to allow various types of signals and information to pass into, or out of, the computer 109. For example, the input/output interface 45 may be used by the computer 109 to receive signals and data from various sensors and detectors of the delivery robot 105. Thus, the computer 109 can obtain images from the camera 101 and/or signals from the ultrasonic sensor 108. As another example, the input/output interface 45 may be used by the computer 109 to receive various types of commands and signals from the personal communications device 175. The commands and/or signals may be associated with operating the delivery robot 105 for conducting operations in accordance with the disclosure.

The memory 50, which is one example of a non-transitory computer-readable medium, may be used to store an operating system (OS) 54, a database 53, and various code modules such as a last mile navigation system module 51 and an image processing module 52. The code modules are provided in the form of computer-executable instructions that are executed by the processor 40 to enable the computer 109 perform various operations in accordance with the disclosure. The last mile navigation system module 51 can be executed for example, by the processor 40, to perform various operations in accordance with the disclosure. Some example operations can include providing instructions to the individual 180 for capturing an image of the premises in which the building 170 is located, converting the captured image into a travel map, and executing a package delivery in accordance with the travel map.

Execution of some of these operations can include the use of the image processing module 52 in order to evaluate various types of images (such as images captured by the individual 180 in any of various formats) and can also include using reference materials such as, for example, a reference topographic map, a reference terrain map, a reference graphical representation of the premises, a reference graphical representation of the building 170, a reference digital rendering of the building 170, and/or a reference digital rendering of an object on the premises. The reference materials may be stored in the database 53.

Figure 12:
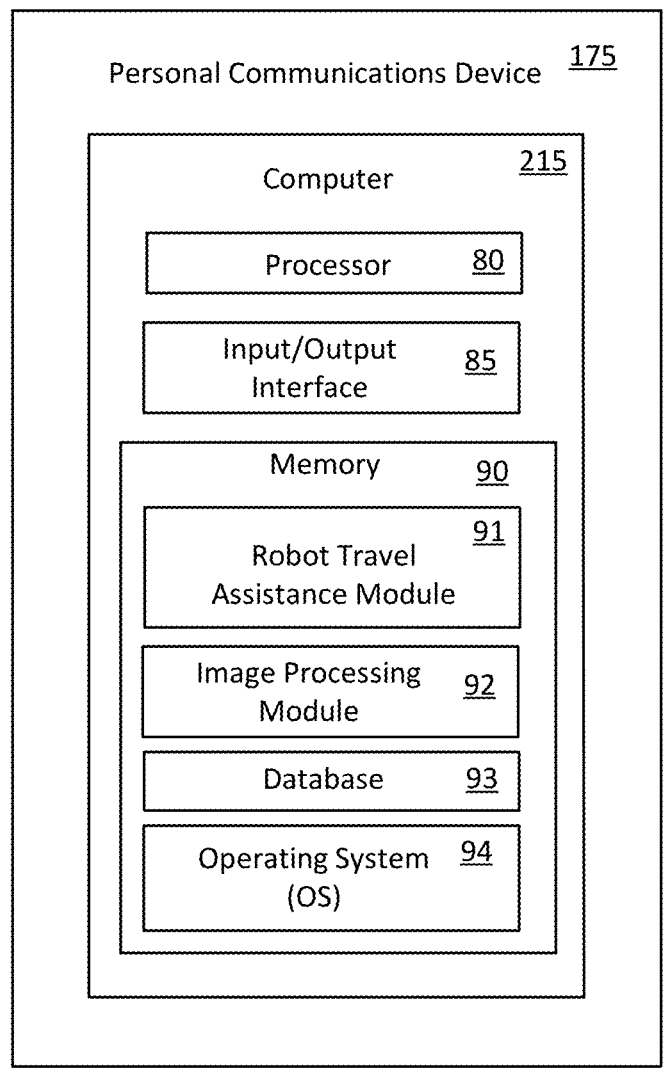
FIG. 12 shows some example components that may be, included in a computer that is a part of a personal communications device in accordance with an embodiment of the disclosure.

FIG. 12 shows some example components that may be included in the computer 215 that is a part of the personal communications device 175 of the individual 180 in accordance with an embodiment of the disclosure. The computer 215 may include various components such as a processor 80, an input/output interface 85, and a memory 90. The input/output interface 85 can be used to allow various types of signals and information to pass into and/or out of the computer 215. For example, the input/output interface 85 may be used to allow signals from the communication system 210 and/or images from the camera 240, to be received by the computer 215.

The memory 90, which is another example of a non-transitory computer-readable medium, may be used to store an operating system (OS) 94, a database 93, and various code modules that can be downloaded into the personal communications device 175 such as, for example, a robot travel assistance module 91 and an image processing module 92. The code modules are provided in the form of computer-executable instructions that are executed by the processor 80 to enable the computer 215 perform various operations in accordance with the disclosure. For example, the robot travel assistance module 91 can be executed by the processor 80 to perform operations such as, for example, capturing an image of the premises in which the building 170 is located and for online processing of the captured image.

The database 93 can be used to store materials such as, for example, a travel map and/or an image of a frontage area of a property. Some of the material stored in the database 93 may be unavailable elsewhere. Other material stored in the database 93 may be obtained by the computer 215 from storage device 226 or from the database 53 of the delivery robot 105.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 50 and the memory 90, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document a "non-transitory computer-readable medium" can be, for example but not limited to, an electronic, magnetic, optical, electro-magnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather the specific features and acts are disclosed as illustrative forms of implementing the embodiments. Conditional language, such as, among others, "can," "could," "might," or "may" unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    capturing an image comprising a package drop-off spot about a building; and
    generating, based on the image, a travel map that is interpretable by a delivery robot for delivering a package to the package drop-off spot, wherein the travel map comprises traversable areas, non-traversable areas, and areas that are conditionally traversable during predetermined time periods,
    wherein the travel map is one of a bird's eye view rendering or a semantic map, wherein the image is a red-green-blue (RGB) image captured by an individual, and wherein generating the semantic map comprises:
        converting the RGB image to a semantic image; and
        converting the semantic image to the semantic map by adding depth information to the semantic image,
    wherein converting the semantic image to the semantic map comprises adding depth information to the semantic image and/or adding a first label to a first area in the semantic image, and
    wherein the first area is designated as a traversable area and wherein the method further comprises:
        adding a second label to a second area in the semantic image, wherein the second area is designated as a non-traversable area; and
        adding a third label to a third area in the semantic image, wherein the third area is designated as a conditionally traversable area, and wherein the third area comprises a driveway that is occupied during after-work hours,
    wherein a travel route to deliver the package avoids the third area during after-work hours.

2. The method of claim 1, wherein generating the bird's eye view rendering comprises:
    converting the semantic map to the bird's eye view rendering using simultaneous localization and mapping (SLAM) procedures.

3. The method of claim 1, wherein the RGB image is captured by a personal communication device and the first label is inserted by the personal communication device, and wherein the first label is edited by the individual.

4. A method comprising:
    evaluating, by a delivery robot, a travel map that is one of a bird's eye view rendering or a semantic map of a frontage area of a building, wherein the travel map comprises traversable areas, non-traversable areas, and areas that are conditionally traversable during predetermined time periods;
    generating, by the delivery robot, based on the evaluating, a travel route through the frontage area; and
    traversing, by the delivery robot, the travel route to deliver a package at a package drop-off spot about the building,
    wherein the one of the bird's eye view rendering or the semantic map of the frontage area is generated from on an image captured by an individual,
    wherein the image is a red-green-blue (RGB) image captured by the individual, and wherein generating the semantic map comprises:
        converting the RGB image to a semantic image; and
        converting the semantic image to the semantic map by adding depth information to the semantic image and/or adding a first label to a first area in the semantic image,
    wherein the first area is designated as a traversable area and wherein the method further comprises:
        adding a second label to a second area in the semantic image, wherein the second area is designated as a non-traversable area; and
        adding a third label to a third area in the semantic image, wherein the third area is designated as a conditionally traversable area, and wherein the third area comprises a driveway that is occupied during after-work hours,
    wherein the travel route avoids the third area during after-work hours.

5. The method of claim 4, wherein the RGB image is captured by a personal communication device and the first label is inserted by the personal communication device, and wherein the first label is edited by the individual.

6. A device comprising:
    a camera; and
    a computer comprising:
        a memory that stores computer-executable instructions; and
        a processor configured to access the memory and execute the computer-executable instructions to perform operations comprising:

capturing an image by operating the camera, the image comprising a package drop-off spot about a building; and generating, based on the image, a travel map that is one of a bird's eye view rendering or a semantic map that is interpretable by a delivery robot for delivering a package to the package drop-off spot, wherein the travel map comprises traversable areas, non-traversable areas, and areas that are conditionally traversable during predetermined time periods, wherein the image is a red-green-blue (RGB) image captured by an individual, and wherein generating the semantic map comprises:

converting the RGB image to a semantic image; and converting the semantic image to the semantic map by adding depth information to the semantic image, wherein converting the semantic image to the semantic map comprises adding depth information to the semantic image and/or adding a first label to a first area in the semantic image, wherein the first area is designated as a traversable area and the device further comprises:

adding a second label to a second area in the semantic image, wherein the second area is designated as a non-traversable area; and adding a third label to a third area in the semantic image, wherein the third area is designated as a conditionally traversable area, and wherein the third area comprises a driveway that is occupied during after-work hours, wherein a travel route to deliver the package avoids the third area during after-work hours.

7. The device of claim 6, wherein generating the bird's eye view rendering comprises:

converting the semantic map to the bird's eye view rendering using simultaneous localization and mapping (SLAM) procedures.

8. The device of claim 6, wherein the RGB image is captured by a personal communication device and the first label is inserted by the personal communication device, and wherein the first label is edited by the individual.

* * * * *